March 30, 1926. 1,578,459

J. A. MILLER ET AL

BRAKE MECHANISM FOR MOTOR ROAD VEHICLES

Filed Dec. 2, 1922 2 Sheets-Sheet 1

Inventors
J. A. MILLER
W. D. MILLER

March 30, 1926.

J. A. MILLER ET AL 1,578,459

BRAKE MECHANISM FOR MOTOR ROAD VEHICLES

Filed Dec. 2, 1922    2 Sheets-Sheet 2

Inventors
J. A. MILLER
W. D. MILLER

Patented Mar. 30, 1926.

1,578,459

UNITED STATES PATENT OFFICE.

JOHN ALEXANDER MILLER AND WILLIAM DOUGLAS MILLER, OF BRIGHOUSE, ENGLAND.

BRAKE MECHANISM FOR MOTOR ROAD VEHICLES.

Application filed December 2, 1922. Serial No. 604,477.

*To all whom it may concern:*

Be it known that we, JOHN ALEXANDER MILLER and WILLIAM DOUGLAS MILLER, subjects of the King of Great Britain, residing at Brighouse, in the county of York, England, have invented new and useful Improvements in and Relating to Brake Mechanism for Motor Road Vehicles, of which the following is a specification.

This invention consists of a particular construction of brake-casing enclosing a brake-pulley, and their arrangement upon a tube encased propeller shaft carried by certain types of motor propelled vehicles, and is intended to control the back-axle when the latter is disconnected from the engine.

The construction of the before-mentioned brake-case is such as to give easy access to the brake-band upon the brake-pulley within, in order that the said brake-band, when requiring to be relined, or for any other cause, may be easily and quickly taken out of the said case or replaced upon the pulley without any interference with the latter. The brake and its casing are also situate so as to have the greatest efficiency, that is, near to the differential gear of the back-axle, and openings provided therein are such that the brake is subjected to air cooling when in use.

We attain these objects by the mechanism illustrated in the accompanying drawings in which—

Figure 1:
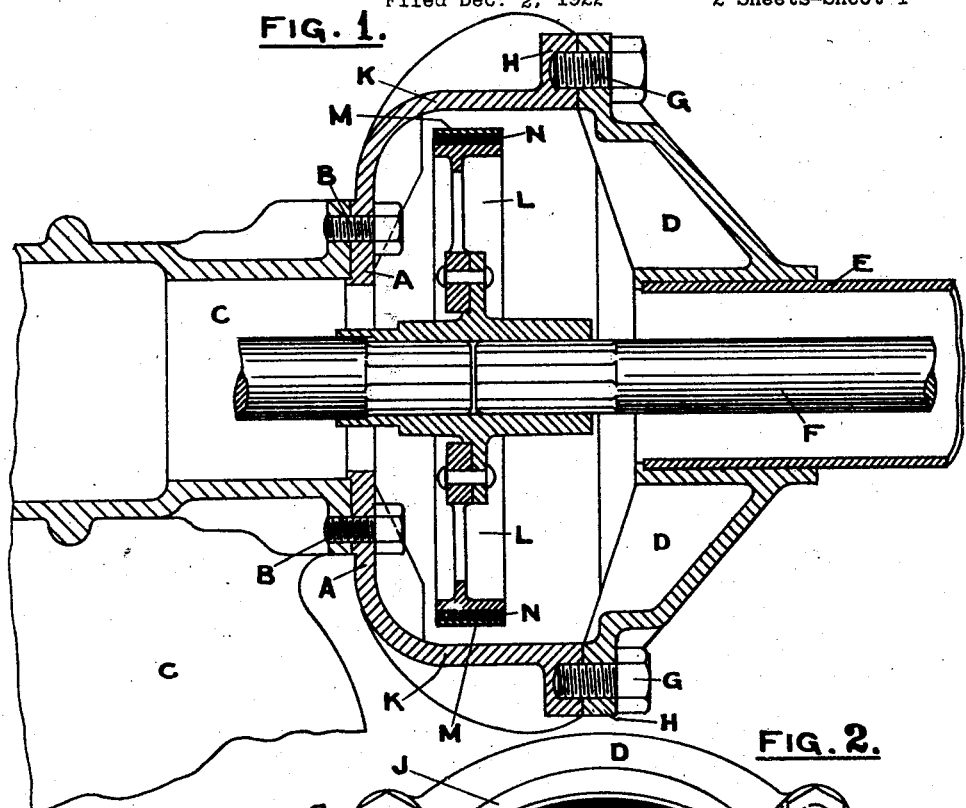
Figure 2:
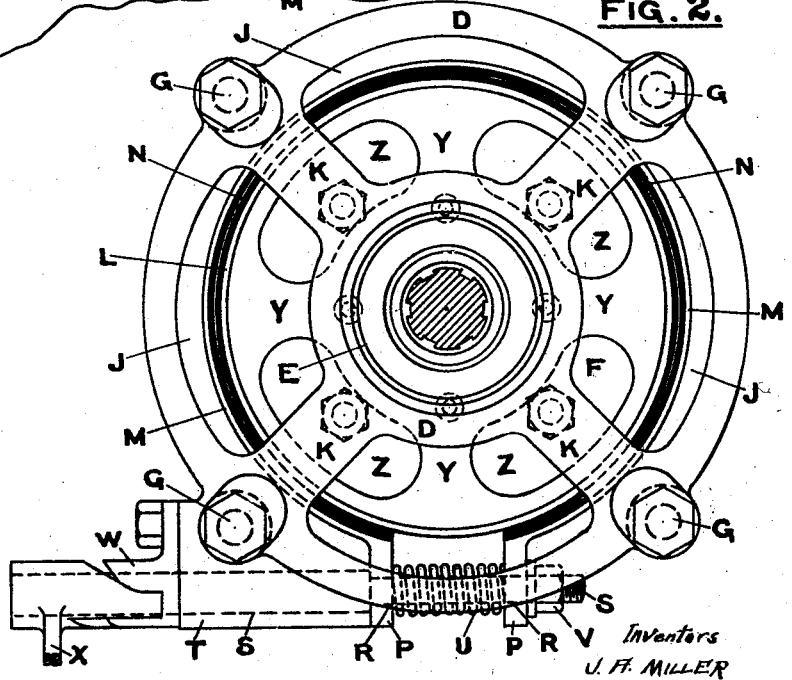
Figure 3:
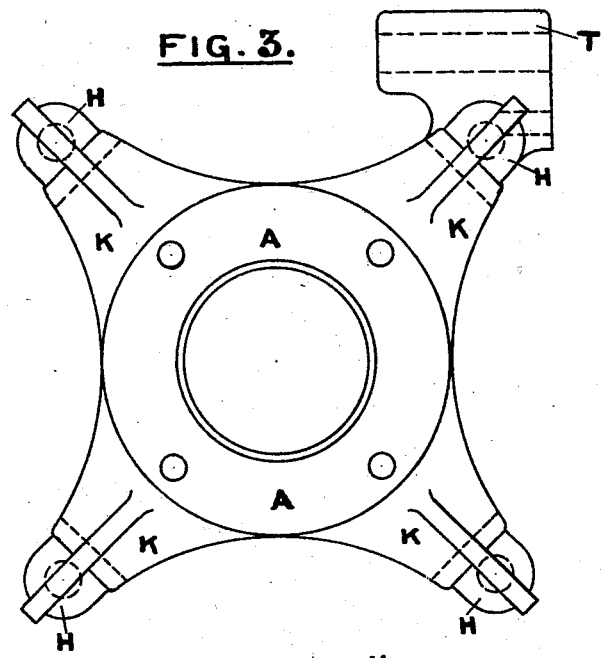
Figure 4:
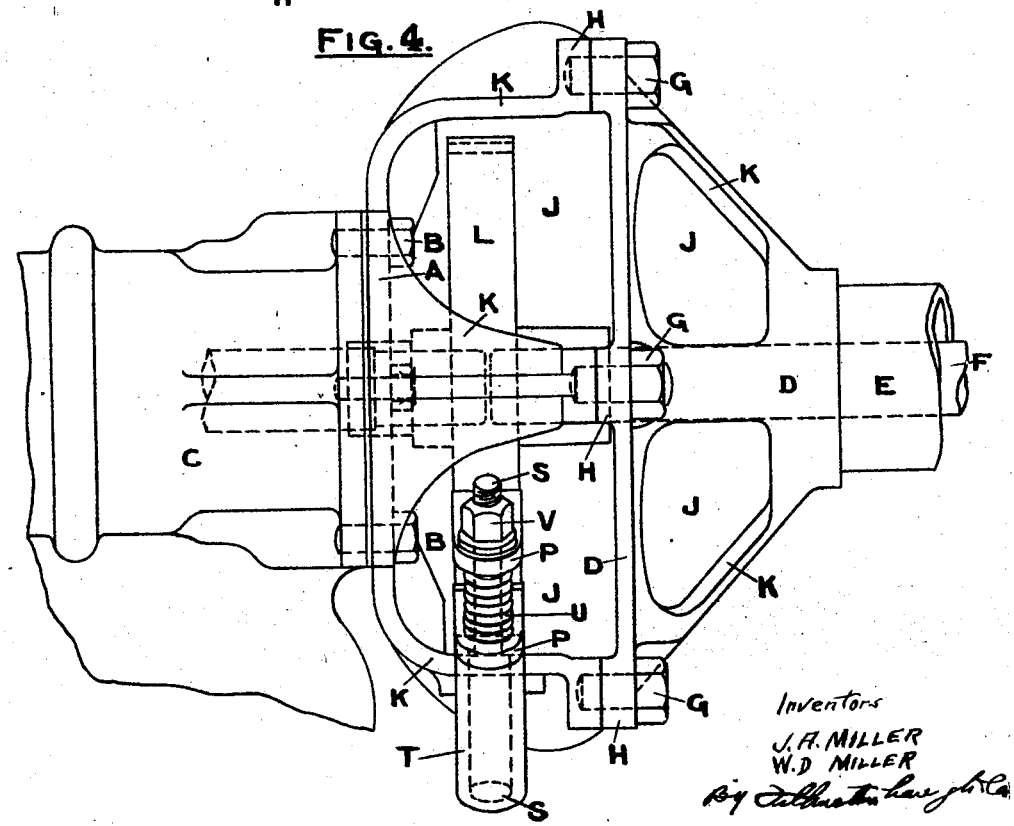

Fig. 1, is a sectional side elevation of our improved brake mechanism as applied to motor propelled vehicles having an encased propeller shaft; Fig. 2 is an end elevation of Fig. 1; Fig. 3 is an end view of the section of brake-casing bolted or otherwise attached to the differential gear case; and Fig. 4 is a side elevation of Fig. 1.

Similar letters refer to similar parts throughout the several views.

Referring to the drawings, A is the section or part of the brake-case, shown attached by bolts or setscrews B to the differential gear case C. D is the other section of brake-case shown attached to the cut tube E normally encasing the propeller shaft F, and to section A by the setscrews or bolts G, G, screwing into the lugs or bosses H, H. J, J, are openings between the arms K, K, of A and D. L is the brake-pulley which is fast upon the adjacent ends of both worm and propeller shafts, and situate well within the section A so as to allow for the axial movement thereon of the brake-band when about to take the same off the pulley and out of the brake-case. M is the brake-band, N is the brake-lining. The ends P of the band M project through one of the spaces between the arms K in section A, and have holes R bored therein through which is passed the end of the operating rod S. T is a bracket, in this case, cast upon or attached to one of the arms K of section A, and bored to support the said rod S. U is a normal tension spring upon this rod placed between the ends P of the band M. V is the adjusting nut. W is the cam bracket bolted to the bracket T, and X is the cam-lever operated, when required, to brake the pulley L by the brake-pedal rod not shown. Y are the pulley arms, and Z are intervening spaces which permit of the extraction of the brake band from within the casing, and also the air current aforesaid to pass through both sections of said casing, for the purposes before described.

Our improved brake-case is also webbed and shaped with regard to the desired mechanical strength.

What we do claim as our invention and desire to secure by Letters Patent is:—

1. In brake mechanism for motor propelled vehicles the combination with the propeller shaft, a brake-pulley thereon, and a brake-band surrounding said pulley and cooperating therewith, of a casing having openings therein inserted in a cut torque tube encasing the said shaft, said casing wholly surrounding the brake-pulley and comprising two separate sections, one section being secured to one part of the cut tube and the other section secured to another part thereof, both sections being suitably bolted together; and cranked ends upon the aforesaid brake-band projecting through an opening in the said casing to which is secured the brake-operating rod, whereby the casing serves as a continuation or part of the torque tube, and gives access to the interior through one of the openings of which the brake-band may be dismantled, removed therefrom, or replaced upon the pulley.

2. In brake mechanism for motor propelled vehicles as described in claim 1, in which integral bracket means is provided for the casing adapted to provide bearing means for the corresponding end of the brake-operating rod, securing said rod to the projecting ends of the brake-band, a spring upon the rod between the ends of the brake-band, and a nut screwing on to the said rod and into engagement with the brake-band.

3. In a brake assemblage, the combination of a propeller shaft, a brake pulley fixed thereon, a brake band engaged around said pulley, a torque tube enclosing the propeller shaft and divided to terminate in spaced relation to the pulley at each side of the latter, a housing enclosing said pulley and band and composed of two detachably united sections attached to and supported by the divided ends of said tube and apertured to receive the propeller shaft therethrough, said housing constituting a continuation of said tube and being of a size affording sufficient clearance to enable the brake band to be moved laterally out of engagement with the pulley and being provided with substantially peripherally arranged openings through which the brake band may pass when extracting the same from the casing or inserting the band for application to the pulley.

In testimony whereof, we have signed our names to this specification.

JOHN ALEXANDER MILLER.
WILLIAM DOUGLAS MILLER.